(12) United States Patent
Jin et al.

(10) Patent No.: US 9,009,157 B2
(45) Date of Patent: Apr. 14, 2015

(54) APPARATUS AND METHOD FOR PROCESSING A DATA STREAM

(75) Inventors: Yeon-Ho Jin, Yongin-si (KR); Jeong-Ja Kim, Suwon-si (KR); Ye-Jin Noh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 12/815,752

(22) Filed: Jun. 15, 2010

(65) Prior Publication Data

US 2011/0119270 A1    May 19, 2011

(30) Foreign Application Priority Data

Nov. 19, 2009  (KR) .................. 10-2009-0112078

(51) Int. Cl.
*G06F 7/00* (2006.01)
*G06F 17/30* (2006.01)

(52) U.S. Cl.
CPC .............................. *G06F 17/30516* (2013.01)

(58) Field of Classification Search
USPC .......................................................... 707/737
See application file for complete search history.

(56) References Cited

U.S. PATENT DOCUMENTS

| | | | |
|---|---|---|---|
| 7,249,120 | B2 | 7/2007 | Bruno et al. |
| 7,359,913 | B1 | 4/2008 | Ordonez |
| 7,840,556 | B1* | 11/2010 | Dayal et al. ............ 707/721 |
| 2004/0249810 | A1* | 12/2004 | Das et al. ............ 707/5 |
| 2004/0254917 | A1* | 12/2004 | Brill et al. ............ 707/3 |
| 2005/0234972 | A1 | 10/2005 | Zeng et al. |
| 2006/0122979 | A1 | 6/2006 | Kapur et al. |
| 2006/0136455 | A1 | 6/2006 | Wen et al. |
| 2007/0226239 | A1* | 9/2007 | Johnson et al. ............ 707/101 |
| 2008/0109421 | A1 | 5/2008 | Yoo et al. |
| 2008/0120292 | A1* | 5/2008 | Sundaresan et al. ............ 707/5 |
| 2008/0133465 | A1 | 6/2008 | Lee et al. |
| 2009/0043729 | A1 | 2/2009 | Liu et al. |
| 2009/0106189 | A1 | 4/2009 | Jain et al. |
| 2009/0106214 | A1 | 4/2009 | Jain et al. |
| 2009/0106215 | A1 | 4/2009 | Jain et al. |
| 2009/0187584 | A1 | 7/2009 | Johnson et al. |
| 2009/0192981 | A1 | 7/2009 | Papaemmanouil et al. |
| 2009/0300615 | A1* | 12/2009 | Andrade et al. ............ 718/100 |

FOREIGN PATENT DOCUMENTS

| | | |
|---|---|---|
| KR | 10-2003-0013656 | 2/2003 |
| KR | 10-2006-0045782 | 5/2006 |
| KR | 10-2007-0080350 | 8/2007 |
| KR | 10-2008-0041911 | 5/2008 |
| KR | 10-2008-0050818 | 6/2008 |

OTHER PUBLICATIONS

Nehme, Rimma V., "Continuous Query Processing on Spatio-Temporal Data Streams," Worcester Polytechnic Institute, Jun. 2005.*

* cited by examiner

*Primary Examiner* — Truong Vo
(74) *Attorney, Agent, or Firm* — NSIP Law

(57) ABSTRACT

An apparatus and method for processing a data stream using a cluster query, are provided. Collected queries are clustered into a predetermined vector space based on a feature vector of the collected queries. In response to a query received from a user, the received query is classified to a cluster and may be replaced with a centroid query of the cluster to which the received query belongs. The data stream processing apparatus processes the centroid query and provides an approximate result to the user.

17 Claims, 6 Drawing Sheets

APPARATUS AND METHOD FOR PROCESSING A DATA STREAM

CROSS-REFERENCE TO RELATED APPLICATION(S)

This application claims the benefit under 35 U.S.C. §119 (a) of Korean Patent Application No. 10-2009-0112078, filed on Nov. 19, 2009, the entire disclosure of which is incorporated by reference herein for all purposes.

BACKGROUND

1. Field

The following description relates to a Data Stream Management System (DSMS).

2. Description of the Related Art

A DataBase Management System (DBMS) is generally used to extract specific information from structured data. However, a new scheme of processing data has been is developed with the emergence of new technologies such as a Sensor Network, Mobile Sensing, and Real Time Web. The new processing scheme dynamically processes the data of the Sensor Network, the Mobile Sensing, and/or Real Time Web as it is continuously being streamed across a network.

The technology for handling dynamic data is referred to as Data Stream Processing, and also referred to as a Data Stream Management System (DSMS). DSMS differs from DBMS which handles static data.

Data Stream Processing has been used in industrial fields such as network monitoring and logistic monitoring including radio frequency identification (RFID) as well as in other specialized fields. As personal terminals including one or more sensors attached thereto have become available on the open market, users now have a data stream based service. An example of such a data stream based service includes a service for reporting a traffic flow or population density based on a mobile position sensor and a health care service that uses a biosensor attached to a personal terminal.

However, as a number of users receive a data stream based service, a system for processing a significant amount of continuously changing mass data stream suffers because of the load of handling a large number of queries requested by the users. For example, a mobile position sensor based service that processes queries requested by users while monitoring a data stream on position information sent from a large number of mobiles devices.

SUMMARY

In one general aspect, there is provided an apparatus for processing a data stream using a cluster query, the apparatus including a cluster generation unit configured to generate at least one cluster for queries that are collected and to extract a representative query for each generated cluster, and a query classification unit configured to, in response to receiving a query from a user, determine a cluster to which the received query belongs and map the received query to a representative query of the determined cluster.

The apparatus may further include a query execution unit configured to execute the received query by executing the representative query to which the received query is mapped.

The collected queries may include a feature vector and the cluster may be generated based on the feature vector of the collected queries.

The feature vector may be based on at least one of a word sequence or an operator within a conditional statement of a collected query.

The cluster generating unit may be configured to define a vector space based on the feature vector and cluster the collected queries in the vector space.

The number of clusters generated may be determined based on at least one of statistics included in the collected queries and statistics based on performance of the data stream processing apparatus.

The cluster may be generated at predetermined time intervals or corresponding to a basic query.

The representative query may be a centroid of the cluster.

In another aspect, there is provided a method of processing a data stream using a cluster query, the method including generating at least one cluster for queries that are collected, extracting a representative query for each generated cluster, and in response to receiving a query from a user, determining a cluster to which the received query belongs and mapping the received query to a representative query of the determined cluster.

The method may further include executing the received query by executing the representative query to which the received query is mapped.

The collected queries may include a feature vector and the cluster may be generated based on a feature vector of the collected queries.

The feature vector may be based on at least one of a word sequence or an operator within a conditional statement of the collected query.

The generating of the cluster may include defining a vector space based on the feature vector and clustering the collected queries in the vector space.

The cluster may be generated at predetermined time intervals or corresponding to basic query.

The representative query may be a centroid of the cluster.

Other features may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and structures may be omitted for increased clarity and conciseness.

Figure 1:
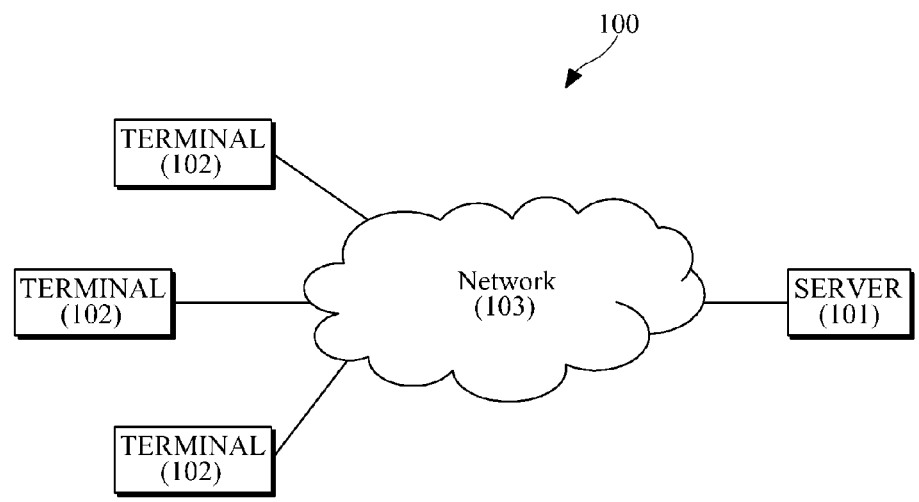
FIG. 1 is a diagram illustrating an example of a system execution environment.

FIG. 1 illustrates an example of a system execution environment.

Referring to FIG. 1, a system environment 100 includes one or more servers 101, one or more terminals 102, and a network 103. The server 101 and the terminals 102 exchange information with each other through a network 103. The information exchanged between the server 101 and the terminals 102 includes a data stream and a query.

The terminal 102 is provided with a sensor for sensing various types of data. For example, the sensor may be a position sensor, a Global Positioning System (GPS) sensor, a speed sensor, a temperature sensor, and the like. A non-limiting example of a terminal 102 may be a mobile phone, a Personal Digital Assistant (PDA), a MP3-player, a health care device that is equipped with a sensor described above, and the like.

The terminal 102 transmits sensed data to the server 101. For example, if the terminal 102 is implemented as a mobile phone capable of receiving GPS information, the terminal 102 may transmit GPS information to the server 101 at predetermined intervals.

The server 101 analyzes data received from the terminal 102 in real time and provides a user of the terminal with information that may be valuable to the user. For example, the server 101 may be a data stream management server. For example, if a user provides the server 101 with a question asking how many people are positioned in a predetermined area, the server 101 may notify the user of the number of people positioned in the predetermined area by analyzing GPS information received from the terminal 102.

Figure 2:
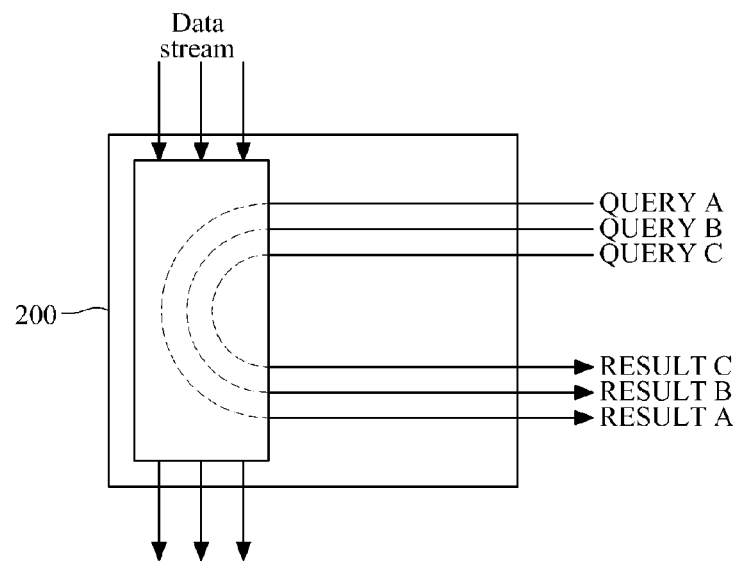
FIGS. 2 and 3 are diagrams illustrating examples of a data stream being processed.
Figure 3:
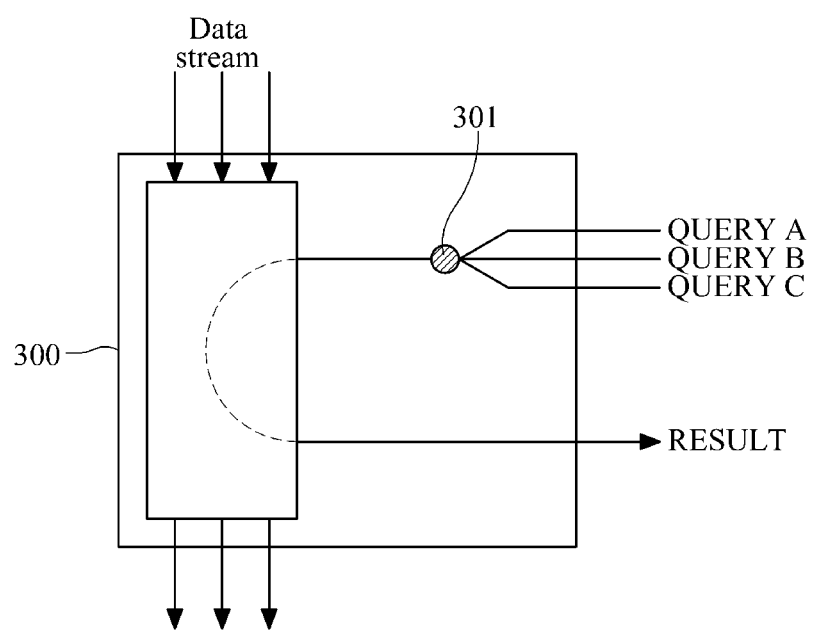

FIGS. 2 and 3 illustrate examples of a data stream being processed.

Referring to FIG. 2, a data stream processing apparatus 200 receives a data stream and queries from a plurality of terminals 102, and process the data stream for each query.

For example, queries A, B, and C may be as follows:
Query A: How many people are positioned around exit 6 of the Ballston subway station?
Query B: How many people are positioned around John Doe bakery near the Ballston subway station?
Query C: How many people are positioned around the Ballston subway station?

The data stream processing apparatus 200 may process the above queries and provide a user with results. An example of the results from the queries may be as follows:
Result A: about 1100;
Result B: about 1180; and
Result C: about 1200.

The result provided from the data stream processing apparatus 200 to the user may be an approximate value or an exact value. Because the data stream dynamically changes with time, the processing load involved for providing a precise value may be quite high. Thus, the data stream processing apparatus 200 may filter or sample the input data stream to reduce the load of data processing. For example, when the data stream processing apparatus 200 provides an approximate value to the user the data stream processing apparatus 200 may sample only is selected areas of data and filter only some of the received data to reduce overall processing load. Accordingly, even though the data stream processing apparatus 200 provides an approximate value for each query, the operation efficiency of the data stream processing apparatus 200 may be reduced.

In some embodiments, if queries bounded based on a similarity are simultaneously processed such that the same result value is provided for the queries, the time and effort needed to process the data streams may be reduced while the demands of the user are still satisfied.

Referring to FIG. 3, the data stream apparatus 300 maps query A, query B, and query C to a predetermined query 301. The query 301 may be represented as a term, for example, a representative query, an alternative query, a cluster query, and the like.

For example, query A, query B, and query C may be as follows:
Query A: How many people are positioned around exit 6 of the Vienna subway station?
Query B: How many people are positioned around John Doe bakery near the Vienna subway station?
Query C: How many people are positioned around the Vienna subway station?

The data stream processing apparatus 300 may map query A, query B, and query C to a representative query described below.

For example, the representative query may ask, "how many people are currently positioned around the Vienna subway station?"

The representative query 301 may be the same as one of query A, query B, and query C or may not be the same as any of query A, query B, or query C. In this example, query C is selected as the representative query 301.

The data stream processing apparatus 300 may process the data stream using the is representative query 301 and provide the user with a result as follows:
Result: about 1200.

In this example, the execution result for the data stream processing may be approximated, and the user may receive the approximate result. Accordingly, if a single query is formed by binding similar types of queries and the single query is processed and provided to the user, the load of data stream that is processed may be reduced.

Figure 4:
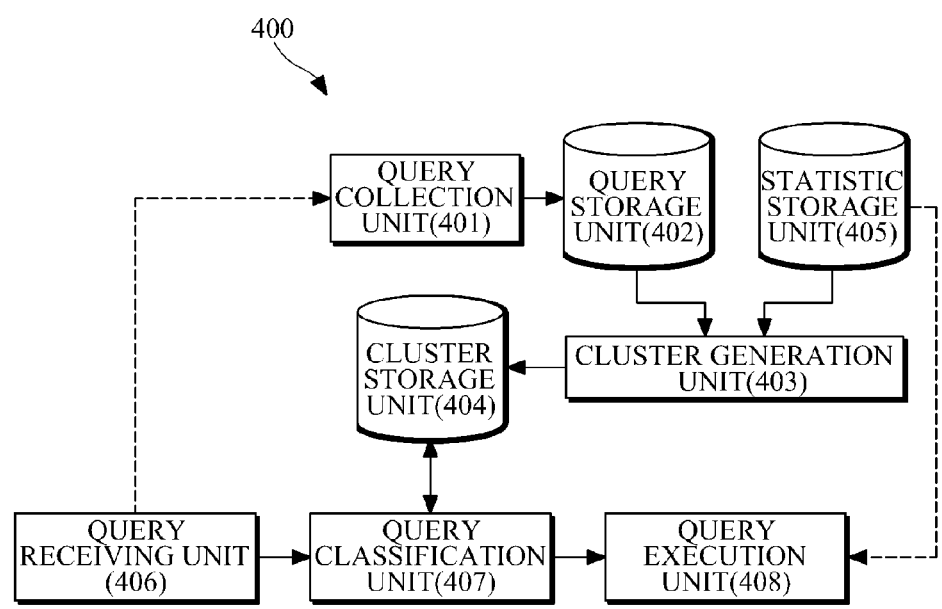
FIG. 4 is a diagram illustrating an example of a data stream processing apparatus.

FIG. 4 illustrates an example of a data stream processing apparatus.

Referring to FIG. 4, the data stream apparatus 400 includes a query collection unit 401, a query storage unit 402, a cluster generation unit 403, a cluster storage unit 404, a statistic storage unit 405, a query receiving unit 406, a query classification unit 407, and a query execution unit 408.

The query collection unit 401 collects queries. The queries to be collected may include queries predicted to be requested by a user, queries received during a beta test period of a system, queries received by a user in real time, and the like.

The query collection unit 401 normalizes the collected queries and stores the normalized queries in the query storage unit 402. The normalization may convert queries which are represented in different forms into a standard representation form for queries.

The cluster generation unit 403 generates a cluster for collected queries, and extracts a representative query from the generated cluster. The generated cluster and the representative query are stored in the cluster storage unit 404.

The cluster generation unit 403 may generate the cluster based on a feature vector of the collected queries. The feature vector may be a part of the queries except for a common part in the queries. For example, the feature vector may be a word sequence or an operator within a conditional statement of the collected query.

The cluster generation unit 403 may define a predetermined vector space based on the is feature vector of the collected queries, and may cluster the collected queries in the vector space. The vector space may be represented as a dimension-graph having a predetermined dimension based on the feature vector.

The cluster generation unit 403 extracts, as a representative query, one of the collected queries, which are clustered in the vector space, and stores the extracted representative query for each cluster in the cluster storage unit 404.

For example, the collected queries may be as follows:
Query A: How many people are positioned around exit 3 of the Metro Center subway station?
Query B: How many people are positioned around John Doe bakery near the Metro Center subway station?
Query C: How many people are positioned around the Metro Center subway station?

In queries A, B, and C, the phrase, "the number of people" is in common in each of the queries. Accordingly, the feature vector may be a location around exit 3 of the Metro Center subway station, around John Doe bakery near the Metro Center subway station, and/or around the Metro Center subway station. In this example, because the above feature vectors relate to only one type of feature vector associated with "location", the vector space is considered a one-dimensional space.

For example, the cluster generation unit 403 may mark queries A, B, and C as dots on a predetermined line. The cluster generation unit 403 may cluster queries A, B, and C represented as dots on the predetermined line into k clusters. The variable k may be determined based on statistics of the collected queries or statistics on a performance of a system. The statistics of the queries may be, for example, information about the most frequently received query during a predetermined time period or the most popular time period during which a predetermined query is received. Referring back to FIG. 1, the statistics on system performance may be, for example, performance information such as computing power of a Central Processing Unit (CPU) of the server 101 and a memory size of the server 101. Such statistics may be stored in the statistic storage unit 405. The cluster generation unit 403 selects one of the queries exiting within the cluster as a representative query.

The cluster generation unit 403 may generate clusters corresponding to a basic query or at predetermined time intervals. The basic query may be a common part of a plurality of queries. The predetermined time interval may be equal time intervals or a predetermined time period.

The query receiving unit 405 receives a query from a user. The query received by the query receiving unit 405 may be selectively input to the query collection unit 401.

The query classification unit 407 determines a cluster to which the received query belongs. In the case that a plurality of clusters each including a plurality of items exist, the determining of a cluster having a newly introduced item may be implemented by various generally known methods. For example, the query classification unit 407 may determine a cluster to which the received query belongs by comparing a feature vector of a received query with a feature vector of a representative query of a cluster. It is to be understood that the method of determining a cluster having a received query is not limited thereto.

The query classification unit 407 loads up a representative query of a determined cluster, for example, a cluster that is similar to the received query and loads the query into the cluster storage unit 404. The query classification unit 407 replaces the received query with the loaded representative query. Accordingly, the received query may be mapped to the representative query.

For example, queries A, B, and C may be grouped into one cluster and query C may be extracted as a representative query. Also, a query indicating "how many people are positioned around exit 1 of the Metro Station subway station?" may be received.

The received query may be classified into a cluster to which queries A, B and C belong. The classification may be based on each of queries A, B, and C having a feature vector in common, such as a feature vector related to the Metro Center subway station. Accordingly, the query classification unit 407 may replace the received query with query C that may serve as the representative query.

The query execution unit 408 executes the representative query. For example, the received query may be mapped to query C that serves as the representative query, and query C may indicate how many people are positioned around exit 1 of the Metro Center subway station. Accordingly, when a user makes a request for the number of people positioned around exit 1 of the Metro Center subway station, a result of the query execution unit 408 may represent the number of people positioned around the Metro Center subway station. In this example, a dynamically changing data stream may be processed by mapping the query to a representative query.

Alternatively, the execution may be based on the performance of a system stored in the statistic storage unit 405. For example, if the cost for query processing exceeds the system performance, the query execution unit 408 may execute the received query without executing the representative query.

Figure 5:
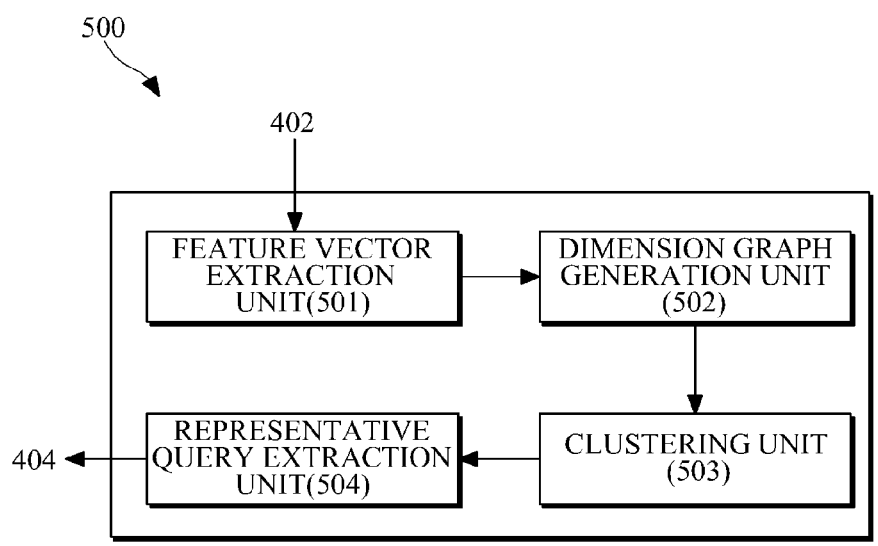
FIG. 5 is a diagram illustrating an example of a cluster generation unit.

FIG. 5 illustrates an example of a cluster generation unit.

Referring to FIG. 5, cluster generation unit 500 includes a feature vector extraction unit 501, a dimension-graph generation unit 502, a clustering unit 503, and a representative query extraction unit 504.

The feature vector extraction unit 501 extracts a feature vector from a collected query. The feature vector may be based on a word sequence or an operator within a statement of the collected query.

The dimension-graph generation unit 502 defines a vector space having a predetermined is dimension based on a feature vector. The dimension-graph generation unit 502 represents the collected queries in the vector space based on the feature vector. The dimensions of the vector space may differ depending on the type of feature vector. For example, if the feature vector is associated with the location, the vector space may be represented as a one-dimensional space. If the feature vector includes multiple factors, for example, the gender of people and the location, the vector space may be represented as a two-dimensional space. For example, the collected queries may be as follows:
Query A: How many people are positioned around exit 4 of the New Carrollton subway station?
Query B: How many people are positioned around John Doe bakery near the New Carrollton subway station?
Query C: How many people are positioned around the New Carrollton subway station?

In this example, in queries A, B, and C, the phrase "How many people are positioned" is the common part, and parts indicating the location, for example, "exit 4 of the New Carrollton subway station," "around John Doe bakery near the New Carrollton subway station," and "around the New Carrollton subway station," are the feature vectors. In this example, the feature vector relates to one type of feature vector. Accordingly, queries A, B, and C may be represented as dots in a one-dimension vector space.

As another example, the collected queries may be as follows:

Query A1: How many men are positioned around exit 4 of the New Carrollton subway station?
Query A2: How many women are positioned around exit 4 of the New Carrollton subway station?
Query B1: How many men are positioned around John Doe bakery near the New Carrollton subway station?
Query B2: How many women are positioned around John Doe bakery near the New Carrollton subway station?
Query C1: How many men are positioned around the New Carrollton subway station?
Query C2: How many women are positioned around the New Carrollton subway station?

In queries A1, A2, B1, B2, C1 and C2, the phrase "how many men/women are positioned" is the common part, and the terms corresponding to the location and gender are the feature vectors. Accordingly, each of the queries may be represented as a dot in a two-dimensional vector space. For example, the X-axis may correspond to the location and the Y axis may correspond to the gender in the two-dimensional space.

The clustering unit 503 clusters queries in the vector space based on the query representation that is generated by the dimension-graph generation unit 502. The clustering refers to an operation of grouping several items into one group based on a similarity of the items. The single group formed based on the similarity is referred to as a cluster.

The number of clusters to be generated by the clustering unit 503 is determined based on the statistic of queries and the system performance. The greater the amount of clusters generated allow for a more accurate result for queries but at the same time increases the processing load. As described above, the result on data processing does not need to have complete accuracy, so the number of clusters may be set while adjusting the processing load and degree of accuracy.

The representative query extraction unit 504 selects a representative query from each of the clusters. The representative query may be the centroid of each cluster but is not limited thereto. The representative query may be selected from queries around the centroid.

Figure 6:
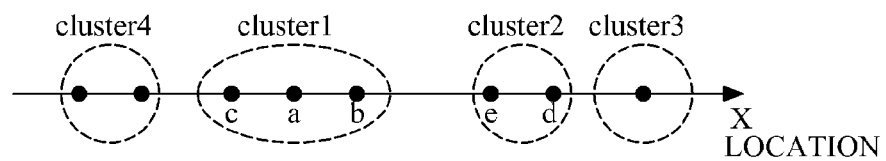
FIG. 6 is a diagram illustrating an example of query clusters.

FIG. 6 illustrates an example of query clusters.

Referring to FIG. 6, collected queries are represented in a one-dimensional vector space. In this example, the X axis is used to define the one dimensional vector space and may represent a feature vector associated with location. Each query is represented as a query point in the one-dimensional vector space.

For example, point "a" may correspond to a query that asks, "how many people are positioned around exit 3 of the Rosslyn subway station," point "b" may correspond to a query that asks, "how many people are positioned around John Doe bakery near the Rosslyn subway station," point "c" may correspond to a query that asks, "how many people are positioned around the Rosslyn subway station," point "d" may correspond to a query that asks, "how many people are positioned around exit 1 of the Dunn Loring subway station," and point "e" may correspond to a query that asks, "how many people are positioned around Jane Doe dental clinic near the Dunn Loring subway station."

The distance between points may be determined based on the similarity between the word sequences or between the operators within a conditional statement of query statements. For example, because point "a" and point "b" have a word sequence of "Rosslyn subway station" in common, point "a" and point "b" may be disposed adjacent to each other.

In this example, cluster 1 includes points "a", "b", and "c" and cluster 2 includes points "d" and "e". Depending on how many clusters are to be generated, points "a", "b", "c", "d", and "e" may belong to the same cluster or different clusters. The number of clusters may be adjusted in consideration of the system performance and the statistics gathered from the queries.

For example, a representative query of cluster 1 may be a query corresponding to point "a", and a representative query of cluster 2 may be a query corresponding to point "b". The representative query may be the same as the centroid of the cluster.

Figure 7:
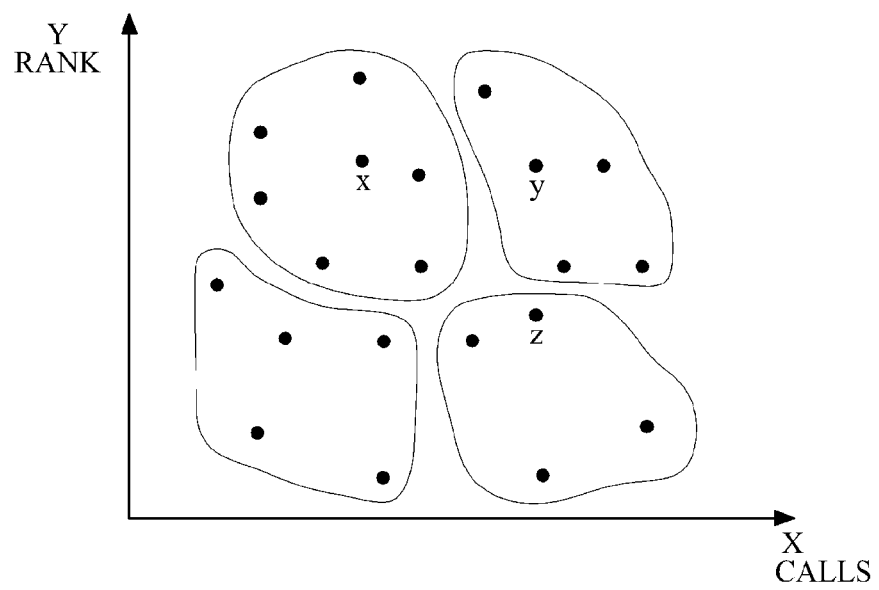
FIG. 7 is a diagram illustrating another example of query clusters.

FIG. 7 illustrates another example of query clusters.

Referring to FIG. 7, the collected queries are represented in a two-dimensional vector space. The X axis may correspond to a feature vector associated with the number of calls and the Y axis may correspond to a feature vector associated with the rank of a member.

For example, point "x" may be a query that asks, "how long is the average call time of Gold-rank members in the most recent 100 calls?" In this query, the average call time may correspond to a common part in the collected queries, and Gold-rank and recent 100 calls may represent the first feature vector and the second feature vector, respectively.

For example, point "y" may be a query that asks, "how long is the average call time of Gold-rank members in the most recent 200 calls?" Point "z" may be a query that asks, "how long is the average call time of Silver-rank members in the most recent 200 calls?"

As described above with reference to FIG. 6, points having a similarity may be grouped into the same cluster, and a predetermined query point within each cluster may be selected as a representative query.

Figure 8:
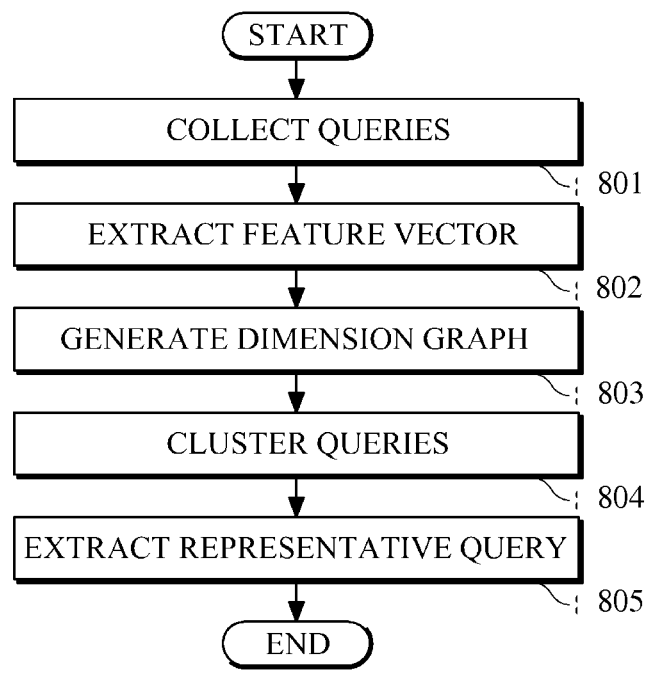
FIG. 8 is a flowchart illustrating an example of a cluster generating method.

FIG. 8 illustrates an example of a cluster generating method.

Referring to FIG. 8, in operation 801, queries are collected to generate a query cluster. The collected queries may include, for example, queries predicted to be requested by a user, queries received during a beta test period of a system, queries received by a user in real time, and the like.

In operation 802, a feature vector is extracted from the collected query. The feature vector may be a part of the queries excluding a common part, for example, the feature vector may be a word sequence or an operator within a conditional statement of the collected queries.

In operation 803, a dimension-graph is generated which is represented in vector space based on a feature vector. Examples of the dimension graph have been shown in FIGS. 6 and 7.

The collected queries are clustered in the vector space in operation 804. Various is clustering algorithms may be used. In some embodiments, queries having a similar characteristic may be grouped into the same cluster, and the characteristic of the query may be set based on the feature vector.

A representative query is extracted from each cluster in operation 805. The representative query may be set, for example, based on the centroid of the cluster, queries around the centroid, and the like.

The query clustering method described with reference to FIG. 8 may be implemented at predetermined time intervals or corresponding to a basic query. For example, if clusters are generated at equal time intervals, queries may be dynamically changed from belonging to one predetermined cluster to another predetermined cluster.

Figure 9:
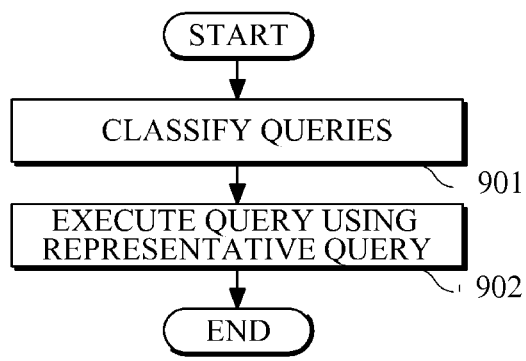
FIG. 9 is a flowchart illustrating an example of a query executing method.

FIG. 9 illustrates an example of a query executing method.

As shown in FIG. 9, in order to execute queries received by a user, the received queries are classified in operation 901. The classification of queries may include, for example, determining a cluster to which the received queries belong to, selecting a representative query from the determined cluster, and replacing the received query with the representative query. The replacement of a query may represent mapping of the receiving query to the representative query.

After the received queries have been classified, the queries are executed using the representative queries in operation 902. If the received query and the representative query have a similar characteristic, that is, a similar feature vector in common, the execution result of the received query and the execution result of the representative query may be valuable to the user because the execution results may be used to perform an approximate determination.

Alternatively, in response to queries being received, the operation cost for the received query is compared with the operation cost for the representative query, and if the operation cost is for the received query exceeds the operation cost for the representative query, the classification of received queries may not be performed and the received queries may be directly processed.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for processing a data stream, the apparatus comprising:

a cluster generator configured to generate at least one cluster of queries based on a commonality of words included in the queries, and to extract a representative query for each generated cluster;

a query classification processor configured to, in response to receiving a query, determine a cluster to which the received query belongs, and map the received query to a representative query of the determined cluster; and a query execution unit configured to execute the representative query from the determined cluster to determine an answer of the representative query based on the data stream, and to provide the answer of the representative query as an approximate answer of the received query instead of processing the received query, wherein the queries comprise a feature vector, and the cluster generator is further configured to generate the cluster based on the feature vector of the queries.

2. The apparatus of claim 1, wherein the feature vector is based on at least one of a word sequence and an operator within a conditional statement of a query.

3. The apparatus of claim 2, wherein the cluster generator is further configured to define a vector space based on the feature vector and cluster the queries in the vector space.

4. The apparatus of claim 1, wherein the number of clusters generated is determined based on at least one of statistics included in the queries and statistics based on performance of the data stream processing apparatus.

5. The apparatus of claim 1, wherein the cluster generator is further configured to generate the cluster at predetermined time intervals or corresponding to a basic query.

6. The apparatus of claim 1, wherein the representative query comprises a centroid of the cluster.

7. The apparatus of claim 1, wherein the cluster generator binds a plurality of queries into a single representative query, and the query execution unit executes only the single representative query and provides the answer of the representative query to other queries bound to the representative query instead of executing and determining an actual answer to each of the plurality of queries.

8. The apparatus of claim 1, further comprising:
a feature vector extraction unit configured to extract at least one feature vector from each of the queries,
a dimension graph generation unit configured to define a vector space in a predetermined number of dimensions based on a number of the at least one feature vector,
wherein the cluster generator is configured to map the queries in the predetermined number of dimensions to generate the at least one cluster.

9. The apparatus of claim 8, wherein the dimensional graph generation unit is configured to define the vector space as a two-dimensional space in response to the feature vector extraction unit extracting two feature vectors.

10. The apparatus of claim 9, wherein the two-dimensional space is defined by an X-axis call and a Y-axis rank.

11. The apparatus of claim 9, wherein the cluster generator is configured to generate the at least one cluster of queries based on a distance between the cluster query and another cluster query in the vector space.

12. The apparatus of claim 1, wherein the feature vector is a part of the queries except for a common part in the queries.

13. A method of processing a data stream using a cluster query, the method comprising:
generating at least one cluster for queries based on a commonality of words included in the queries;
extracting a representative query for each generated cluster;
in response to receiving a query, determining a cluster to which the received query belongs, and mapping the received query to a representative query of the determined cluster;
executing the representative query from the determined cluster to determine an answer of the representative query based on the data stream; and
providing the answer of the representative query as an approximate result of the received query instead of processing the received query,
wherein the queries comprise a feature vector, and the cluster is generated based on the feature vector of the queries.

14. The method of claim 13, wherein the feature vector is based on at least one of a word sequence and an operator within a conditional statement of a query.

15. The method of claim 14, wherein the generating of the cluster comprises defining a vector space based on the feature vector and clustering the queries in the vector space.

16. The method of claim 13, wherein the cluster is generated at predetermined time intervals or corresponding to basic query.

17. The method of claim 13, wherein the representative query comprises a centroid of the cluster.

* * * * *